United States Patent [19]

Costa et al.

[11] Patent Number: 4,542,967
[45] Date of Patent: Sep. 24, 1985

[54] CAMERA ERECTING ASSEMBLY

[75] Inventors: Peter F. Costa, Winthrop; George D. Whiteside, Lexington, both of Mass.

[73] Assignee: Polaroid Corporation, Cambridge, Mass.

[21] Appl. No.: 534,822

[22] Filed: Sep. 22, 1983

[51] Int. Cl.$^4$ ............................................. G03B 17/04
[52] U.S. Cl. .................................... 354/187; 354/193
[58] Field of Search ................................ 354/187–194

[56] References Cited
U.S. PATENT DOCUMENTS 3,418,907 12/1968 Bellows ...................................... 95/39
3,683,770 8/1972 Land et al. ............................... 95/13
3,906,521 9/1975 Ueda ....................................... 354/86

Primary Examiner—L. T. Hix
Assistant Examiner—Douglas S. Lee

[57] ABSTRACT

A folding camera including a first housing having a chamber for locating a film cassette in position for the exposure of a film unit contained therein, a second housing pivotally coupled to the first housing, a flexible bellows connected to the first and second housings, and an erecting assembly for guiding the second housing between a folded inoperative position and an erected operative position. During movement of the second housing into the folded position, members of the erecting assembly move into engagement with a wall of the bellows and assist in folding it inwardly toward an opposite wall of the bellows such that the members of the erecting assembly support that portion of the bellows and prevent it from drooping into the chamber.

5 Claims, 8 Drawing Figures

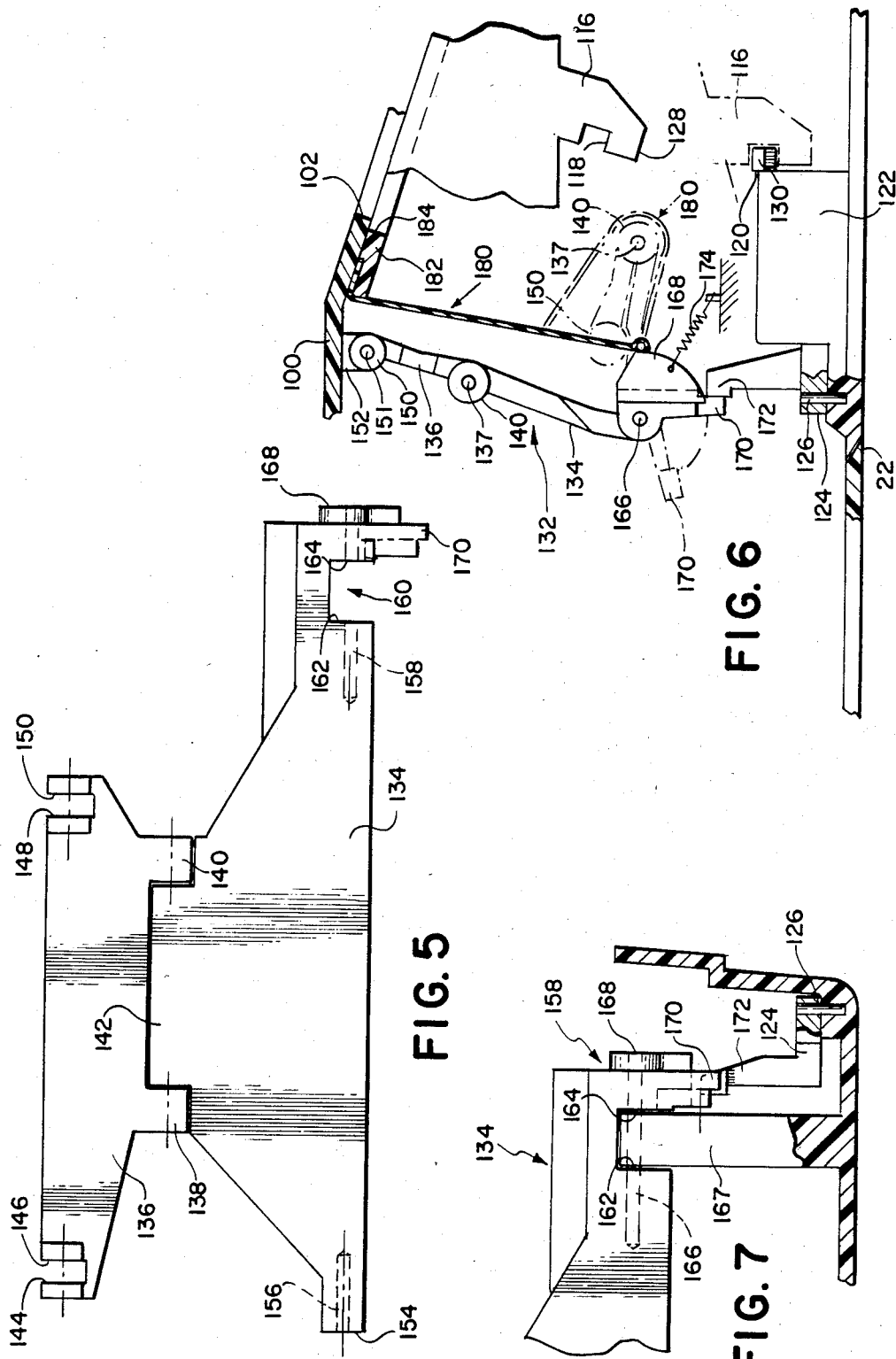

CAMERA ERECTING ASSEMBLY

RELATED APPLICATIONS

This application is related to application Ser. No. 498,980, entitled "Folding Photographic Camera or Similar Article", filed by James M. Conner et al., on May 27, 1983, and assigned in common herewith. This application is also related to application Ser. No. 534,824, U.S. Pat. No. 4,508,440, entitled "Bellows Shielding Structure", by Peter F. Costa and, George D. Whiteside; and to application Ser. No. 534,825, U.S. Pat. No. 4,508,441, entitled "Film Counter", by Kenneth J. Launie; and to application Ser. No. 534,823, now abandoned, entitled "Folding Camera", by George D. Whiteside, all filed on instant date herewith and assigned in common herewith.

BACKGROUND OF THE INVENTION

1. Field of the Invention

This invention relates to a camera having means to effect a reduction in camera size from an operative condition to an inoperative condition.

2. Description of the Prior Art

The present invention relates to a folding camera and, more particularly, to a camera erecting assembly for guiding housings of the camera between erected and folded conditions.

Generally, cameras of the type described have a collapsible bellows which is connected between housings of the camera to thereby provide a lighttight chamber within which image-bearing light is transmitted from a lens in one housing to a film unit located in position for exposure in another housing. Also, some type of erecting assembly is provided for guiding the housings between folded and erected positions and for releasably maintaining the housings in the latter position. An example of this type of arrangement is shown in U.S. Pat. No. 3,418,907 wherein a collapsible erecting assembly comprised of a plurality of planar members is entirely enclosed within the camera's bellows. While this arrangement performs its intended function, it does so at the expense of adding to the overall volume of the camera. This is so because of the necessity to locate the erecting assembly outside of the bundle of image-bearing light rays traveling between the objective lens and the film unit. Thus, the volume enclosed by the bellows is larger than it would have been if the erecting assembly were located exteriorly of the bellows.

As is well known, one of the desired objects in designing a folding camera is to maximize its compactness when the camera is in a folded condition. To achieve this object one must carefully interrelate the positions of various elements of the camera such that they occupy a minimum of space in the folded configuration. One way in which space may be conserved is to fold one or more walls of the bellows inwardly, such as is taught by U.S. Pat. Nos. 3,906,521 and 3,683,770. A possible drawback to this type of arrangement is that when the bellows is so folded, a portion thereof may hang downwardly into the film chamber where it is susceptible to being damaged during the loading of a film cassette into the film chamber.

SUMMARY OF THE INVENTION

The instant invention relates to a camera having means for effecting a reduction in its size as the camera assumes an inoperative condition and, more specifically, to a camera comprised of first and second housings which are pivotally coupled to each other. The first housing includes an open ended film chamber into which a film container is adapted to be loaded and a second chamber or recess which is adapted to receive a portion of the second housing as the latter is moved from an operative extended position to a folded inoperative position. The second housing includes means for supporting a lens and shutter assembly in fixed relation to a mirror mounted within the second housing, i.e., the optical axis of the lens intersects the plane of the mirror at a fixed acute angle of incidence regardless of the position of the second housing. A flexible bellows is connected between the first and second housings in a manner which provides a lighttight chamber or tunnel within which image-bearing light rays may be transmitted to the film unit. When the second housing is in the erected operative position, the mirror functions to redirect image bearing rays passing through the lens and shutter assembly toward the film chamber where the film unit is being supported within a plane for exposure. The second housing is pivotally coupled to the first housing for movement through an angle less than one-half of the aforementioned angle of incidence between a first folded position, wherein a substantial portion of the second housing and the lens and shutter assembly are located within the recess in the first housing, and a second extended position, wherein the second housing and the lens and shutter assembly have been substantially withdrawn from the recess and the optical axis, as redirected or folded by the mirror, intersects the plane of a film unit located in the exposure plane at substantially a right angle.

An erecting assembly comprised of a pair of laterally extending, i.e., from side to side, planar members interconnect the first and second housings so as to guide the second housing between the folded and extended positions as well as to releasably retain the second housing in the later position. When the second housing is moved toward and into the folded position, the planar members move in a toggle fashion toward and into engagement with an exterior surface of the bellows until the wall of the bellows substantially wraps itself around the folded planar members as the second housing enters the folded position. Thus, space is conserved by moving the erecting assembly and the aforementioned wall toward and into the area previously surrounded by the bellows as a whole. Also, in the collapsed position of the erecting assembly, the planar members function to prevent the wall of the bellows from drooping into the film chamber where it may be damaged, as mentioned above.

An object of the invention is to provide a folding camera having a flexible bellows with an erecting assembly which not only guides housings of the camera between extended and folded positions, but which also functions to support a portion of the bellows when the housings of the camera are in the folded position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 5 is a front elevational view of an erecting assembly which functions to maintain the camera in its erected condition;

FIG. 6 is a side elevational view of the erecting assembly;

FIG. 7 shows a partial front sectional view of the erecting assembly; and

DETAILED DESCRIPTION OF THE INVENTION

Figure 1:
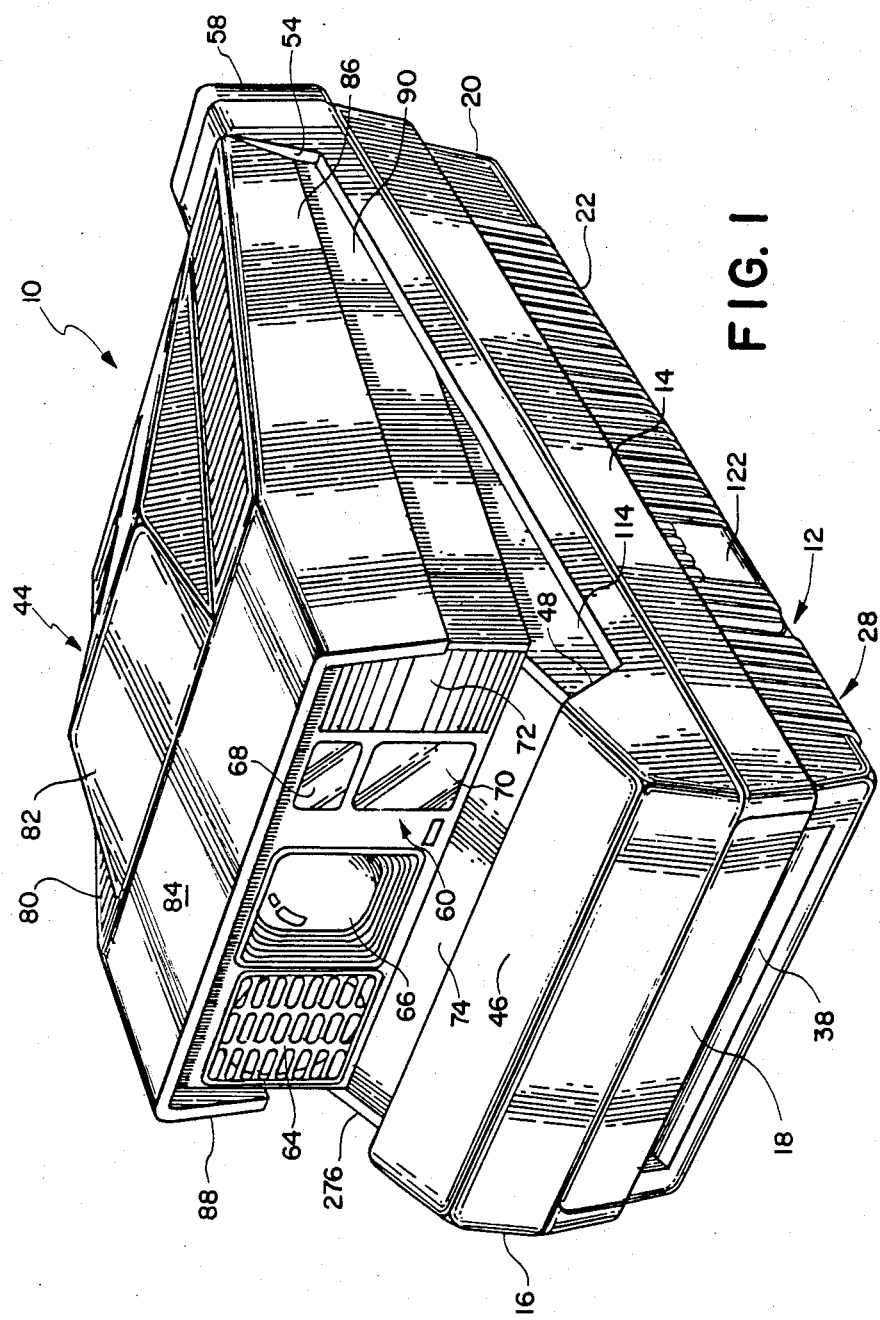
FIG. 1 is a perspective view of a camera which represents a preferred embodiment of the instant invention, the camera being shown in its erected operative condition.
Figure 2:
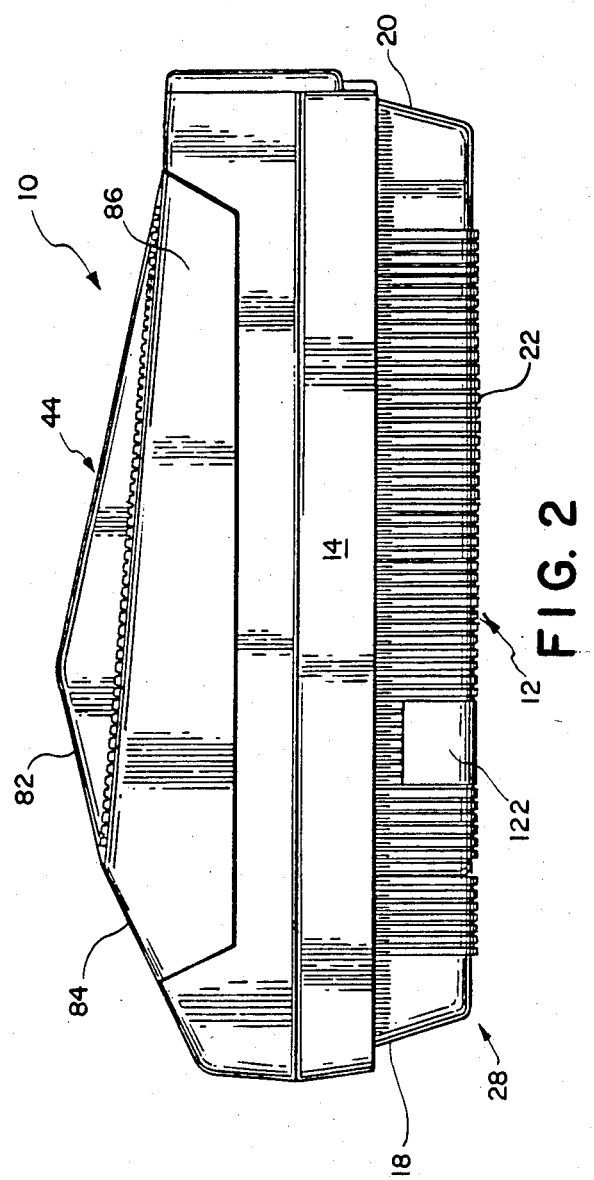
FIG. 2 is a left side elevational view of the camera shown in its folded inoperative condition.

Reference is now made to the drawings and, in particular, to FIGS. 1-4 wherein is shown a folding type camera 10. The camera 10 includes a first housing 12 defined by a pair of side walls 14 and 16, a leading end wall 18, a trailing end wall 20, and a bottom wall 22. A major portion of the side walls 14 and 16 and the bottom wall 22 together with the trailing end wall 20 define an open ended film chamber 24 for receiving a generally parallelepiped configured film cassette 26 so as to locate a film unit of the instant type contained therein in a plane for exposure through an exposure opening 27 in the film cassette 26. A spread roller housing 28, which is a continuation of the first housing 12, extends across the open end of the film chamber 24. Mounted within the housing 28 is a pair of juxtaposed rollers 30 and 32, a plate 34, and a coiled sheet 36 formed from an opaque resilient material having a width approximately equal to that of a film unit and a length greater than that of the film unit. As is well known in the art, the film unit is adapted to be moved out of the film cassette 26, subsequent to exposure, via a slot in a leading end wall thereof and into the bite of the rollers 30 and 32, at least one of which is being driven at this time. The rollers 30 and 32 continue the advancement of the exposed film unit from the film cassette 26 while simultaneously rupturing a container of processing liquid attached to the leading end of the film unit and spreading its contents between elements of the film unit so as to initiate the formation of a visible image therein. As the leading end of the film unit emerges from between the rollers 30 and 32, its leading edge engages the plate 34 and is deflected downwardly into engagement with the coiled sheet 36. Further advancement of the film unit by the rollers 30 and 32 is effective to cause the leading edge of the film unit to uncoil the opaque sheet 36 such that it simultaneously progressively covers the face of the film unit to prevent further exposure thereof as the film unit exits from the camera via a slot 38 in the leading end wall 18. Eventually, the sheet 34 is completely uncoiled and thus releases its hold on the leading edge of the film unit and automatically recoils itself as it returns to its original configuration and position. The rollers 30 and 32 are rotatably supported by a bracket 38, see FIG. 4, which is fixedly secured to the bottom wall of the spread roller housing 28 by means not shown. The bracket 38 is pivotally coupled to the remainder of the first housing at 40 such that the spread roller housing 28 and the bracket 38 may be rotated through approximately ninety degrees so as to enable the loading or unloading of the film cassette 26.

Figure 3:
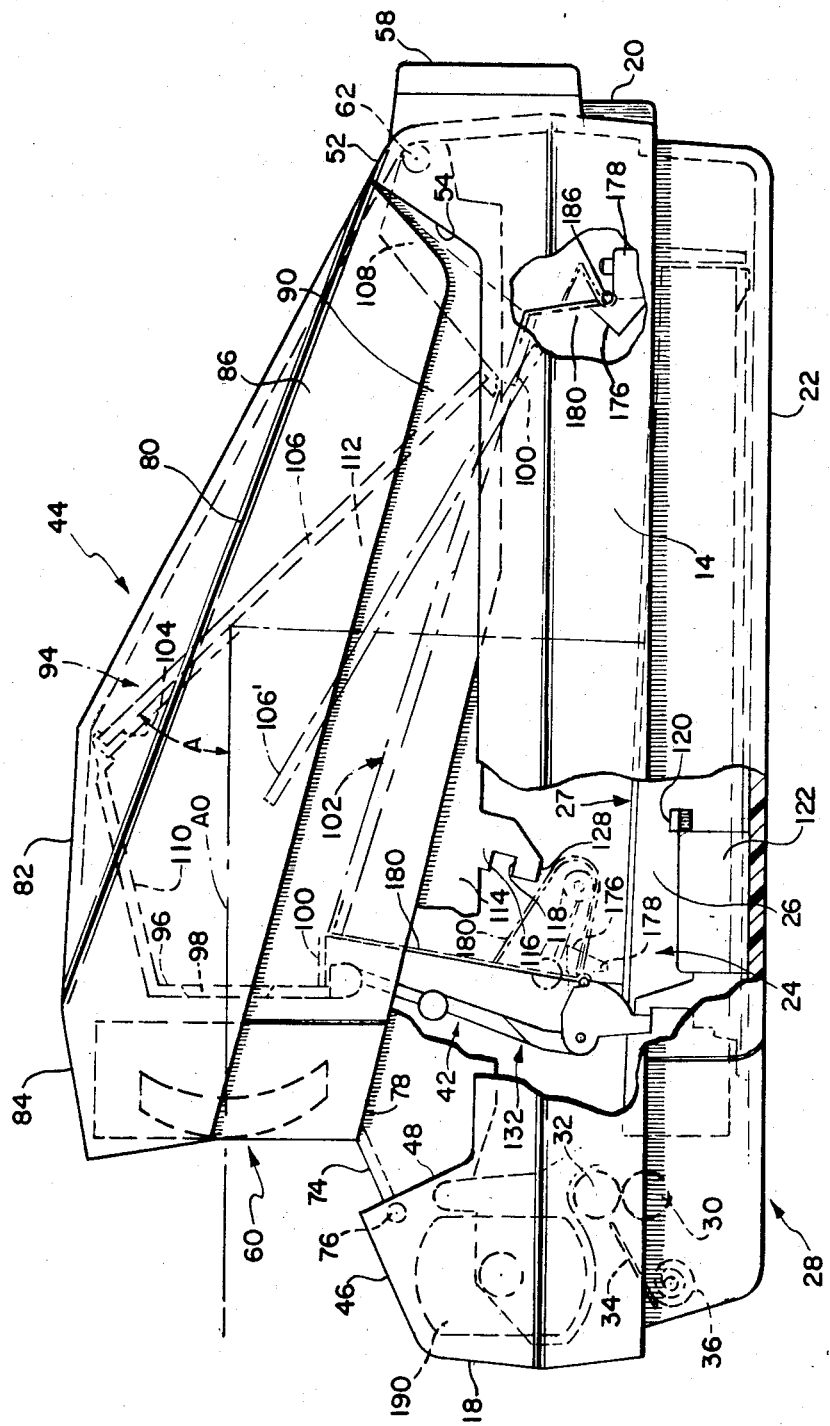
FIG. 3 is a left side elevational view, partly in section, of the camera in its extended operative condition.

The first housing 12 also includes a chamber 42, defined in part by the upper porbions of the side walls 14 and 16, which is adapted to receive a portion of a second housing 44. The leading end wall 18 and the trailing end wall 20 also define boundaries of the chamber 42. As seen in FIG. 3, the leading end wall 18 includes an upwardly and rearwardly slanting portion 46 which terminates at a point where its lateral ends merge with downwardly and rearwardly extending portions 48 and 50 of the side walls 14 and 16, respectively. In a similar manner, the trailing end wall 20 includes an upwardly and forwardly extending portion 52 whose lateral ends merge with downwardly and forwardly extending portions 54 and 56 of the side walls 14 and 16, respectively. The trailing end wall also serves to mount an eye cup 58 through which a scene to be photographed may be framed.

A module 60 is fixedly attached to one end of the second housing 44 whose opposite end is pivotally attached to the first housing at 62, as will be more fully described later. The module 60 includes a sonar type rangefinder 64, a lens and shutter assembly 66, a photocell 68, a viewfinder window 70 and a strobe 72. The gap between the end of the slanting portion 46 of the leading end wall 18 and the face of the module 60 is closed by a plate 74 whose left end, as viewed in FIG. 3, is pivotally coupled to the first housing 12 at 76 and whose right end is positioned in engagement with a bottom wall 78 of the module 60.

The second housing 44 is essentially comprised of a top wall 80 having a centrally located four-sided dome 82 and a forwardly and downwardly extending portion 84. The second housing 44 also includes a pair of side walls 86 and 88 with the side wall 86 having a further downwardly extending portion 90 of reduced thickness which extends in face-to-face relation to the interior surface of the side wall 14 of the first housing 12 when the camera is folded. A shutter release button 92 extends upwardly from the top wall 80.

A cone-shaped assembly 94 is fixedly secured to the second housing 44, as best shown in FIG. 3. The assembly 94 includes a front wall 96 having an opening 98 therein to permit image bearing rays coming from the scene via the lens and shutter assembly 66 to enter the assembly 94. Extending rearwardly from the lower end of the front wall 96 is a bottom wall 100 having an opening 102 therein for permitting image bearing rays to pass from the interior of the cone-shaped assembly 94 to the film chamber 24. The right end of the cone-shaped assembly, as viewed in FIG. 3, is provided with a generally trapezoidally shaped recess 104 into which is secured a similarly shaped mirror 106. A pair of arms 108 (only one being shown) extend upwardly from opposite sides of the right-hand end of the rear wall 100, as viewed in FIG. 3, for rotatably securing the assembly 94 to the first housing 12 at 62. Finally, the assembly 94 is completed by a top wall 110 and a pair of side walls 112, only one being shown, which extend from the front wall 96 to the recess 104 and between the top and bottom walls 110 and 100, respectively.

A skirt 114 extends downwardly from the cone-shaped assembly 94 and inside of the side wall 14 so as to close off the triangular shaped gap between the side wall 14 of the first housing 12 and the portion 90 of the side wall 86, as viewed in FIG. 3. The skirt 114 includes a latch 116 having a recess 118 which is adapted to receive a pin 120 for releasably latching the second housing 44 in its retracted inoperative position. The pin 120 is fixedly mounted on a pad 122. The pad 122, in turn, includes an arm 124 (see FIG. 6) which is pivotally coupled to the bottom wall 22 of the first housing 12 by a pin 126. As the second housing 44 is rotated into its folded position, an end 128 of the latch 116 engages an inclined surface 130 on the pin 120 causing it and the pad 122 to move inwardly until the recess 118 and pin 120 are in alignment with each other. At that time a spring (not shown) rotates the pad 122 and pin 120 back into the position shown in FIG. 6. An U-shaped erecting spring (not shown) has one of its free ends fixedly secured to the first housing 12 and its other free end secured to the skirt for resiliently urging the second housing 44 into its erected position. Such erection is accomplished by the user pressing the pad 122 inwardly so as to move the pin 120 out of the recess 118 thus enabling the tensioned erecting spring to move the second housing 44 into its erected operative position.

The second housing 44 is releasably maintained in the erected operative position by an erecting assembly 132. As best shown in FIGS. 5-7, the erecting assembly 132 includes first and second links 134 and 136, each of which has a plate-like configuration. The links 134 and 136 extend transversely of the camera, i.e., between the sides 14 and 16, and are pivotally coupled to each other by a pin 137 which passes through a pair of knuckles 138 and 140 which are integral with the link 136 and a knuckle 142 which is integrally formed in the link 134. The upper end of the link 136 includes a pair of recesses defined by spaced surfaces 144, 146 and 148, 150, which recesses are adapted to receive flanges 152 (only one being shown) which extend downwardly from the bottom wall 100 of the cone-shaped assembly 94. The surfaces 144, 146, 148 and 150 as well as the flanges 152 are suitably bored so as to receive pins 151 (only one being shown) for pivotally connecting the link 136 to the cone-shaped assembly 94. The bottom of the link 134 includes a first end 154 having a bore 156 therein for rotatably receiving a mounting pin (not shown) and a second end 158 having a recess 160 therein. The recess 160 is defined in part by a pair of facing walls 162 and 164 each of which is bored so as to rotatably receive a pin 166 for connecting the second end 158 of the link 134 to a flange 167 which extends upwardly from the first housing 12. The end 158 includes a member 168, which is also bored to receive the pin 166, having a free end 170 located in engagement with a vertical extension 172 of the arm 124. The first link is resiliently biased in a counterclockwise direction by a spring 174.

The opening 102 in the bottom wall 100 of the cone-shaped assembly 94 is connected by a four-sided bellows 180 to a rectangular opening 176 in a frame 178 located in the first housing 12. The opening 176 is generally coextensive with the exposure opening 27 in the top wall of the film cassette 26. The top of the bellows 180 is secured to the bottom wall 100 by a retainer 182 (see FIG. 6) having an opening 184 therein which is in alignment with the opening 102, and to the frame 178 by a retainer 186 (see FIG. 3).

When it is desired to fold the camera, the user presses inwardly on the pad 122 with a digit of one hand while simultaneously applying pressure with the other hand to the top wall 80 of the second housing. The pressure on the pad 122 results in it and the arm 124 rotating about the pin 126 thus causing the vertical extension 172 to translate to the left, as viewed in FIG. 6. This latter movement results in the first link 134 being rotated in a clockwise direction about the pin 166 thereby moving the pin 137 from a position to the left of a line connecting the axes of the pins 151 and 166 to a position to the right of said line, as viewed in FIG. 6. With the pin 137 so located, downward pressure on the second housing 44 moves it against the bias of the aforementioned erecting spring (not shown) into the inoperative position where it is releasably secured by the latch 116-pin 118 arrangement, previously described.

As best seen in FIG. 3, the optical axis OA of the lens and shutter assembly 66 intersects the plane of the mirror 106 at a fixed angle of incidence A. The angle A has a value of approximately forty-six degrees, thus compensating for the slight upward tilt (approximately two degrees) of the film unit from a horizontal plane. When the second housing 44 is moved into its fully down position, the mirror 106 only has to rotate through an angle of approximately fifteen degrees, i.e., an angle of less than one-half that of the angle A, into its fully down position, as indicated by the broken line 106'. Thus positioned, the lens and shutter assembly 66 is located immediately above the film chamber 24 and behind the rollers 30 and 32.

The flexible bellows 180 is constructed such that during folding of the camera 10 the side walls of the bellows 180 fold inwardly, as does the leading end or front wall thereof, while the trailing end or rear wall of the bellows 180 (to the right in FIG. 3) folds outwardly. The inward folding of the front wall (to the left, as viewed in FIG. 3) of the bellows 180 may give rise to a portion thereof hanging down into the film chamber 24, i.e., a portion of the folded section may fall through the opening 176 in the frame 178. Should this happen when the film chamber 24 is empty, the aforementioned portion could possibly be located in the path of travel that a film cassette 26 would take when it is being inserted, endwise, into the film chamber 24. Engagement between the film cassette 26 and the bellows 180 during such loading of the former may result in the film cassette 26 puncturing or otherwise damaging the bellows 180. Thus, as best seen in FIGS. 3 and 6, the erecting assembly 132 not only functions to releasably maintain the second housing 44 in the erected operative position but it also functions to support the folded front wall of the bellows when the camera 10 is in the folded condition.

Still another feature of the erecting assembly 132 is that as the second housing 44 is accelerated toward the erected position the links 134 and 136 will approach their "toggle position", i.e., a position wherein continued rotation of the links 134 and 136 will result in reversing the rotation of the second housing 44. Thus, as the links 134 and 136 rotate through this toggle position and stop immediately thereafter, the second housing 44 has substantially zero velocity and kinetic energy thus resulting in a minimum impact as it enters the erect position and a smoother opening.

The camera 10 includes a battery operated motor 190 whose output is coupled with the roller 32 via a gear train 192. The gear train 192 includes a gear 194 which has an inwardly projecting pin 196 on one of its faces. The gear 194 is adapted to be rotated through only a single revolution for each photographic cycle of the camera, and during such revolution the pin is adapted to actuate a film advancing apparatus 198 so as to move an exposed film unit out of the film cassette 26 and into the bite of the rollers 30 and 32.

The film advancing apparatus 198 includes a vertically oriented plate 200 having an inwardly directed flange 202 located intermediate its opposite ends. A pair of pins 204 and 206 extend through the plate 200 and their ends are adapted to be received in horizontal tracks (not shown) so as to enable reciprocal movement of the plate 200 toward and away from the rollers 30 and 32. A resilient arm 208 is attached to the flange 202 such that its free end 210 may extend into an opening in the film cassette 26 and engage a trailing edge of an uppermost film unit in the film cassette 26. The plate 200 also includes an outwardly extending flange 212 which is adapted to be engaged by the pin 196 located on the gear 194 during rotation of the latter in a counterclockwise direction so as to drive the plate 200 to the right, as viewed in FIG. 4. Such movement results in the end 210 of the arm 208 moving the uppermost film unit in the film cassette 26 into the bite of the rollers 30 and 32. As is well known in the art, the rollers 30 and 32 rupture a container of processing liquid attached to the leading end of the film unit and spread its contents between elements of the film unit while simultaneously continuing its movement to the exterior of the camera 10. A spring (not shown) is attached to the plate 200 so as to return it to the position shown in solid line in FIG. 4 after the pin 196 has moved out of engagement with the flange 212.

Figure 4:
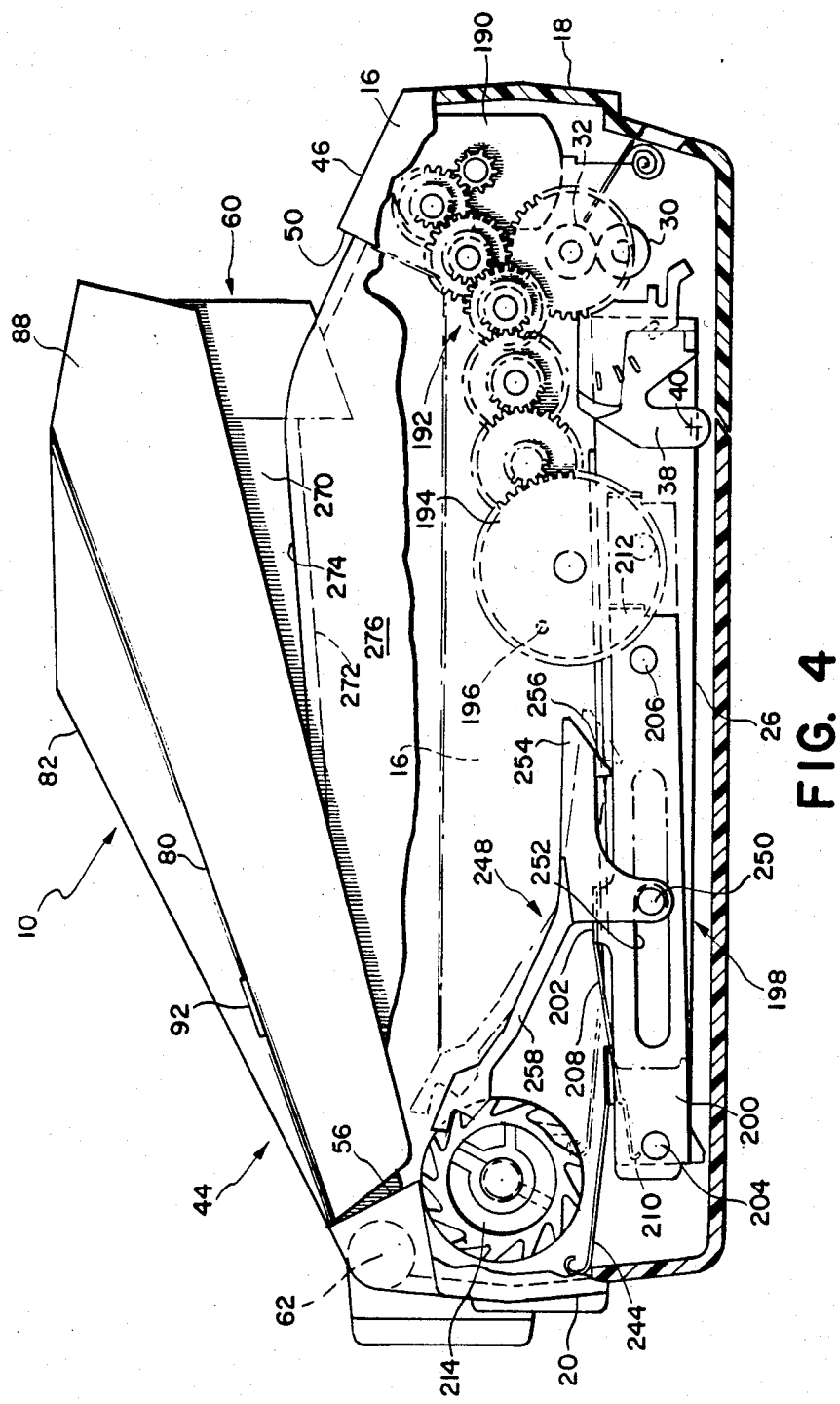
FIG. 4 is a right side elevational view, partly in section, of the camera, certain structural elements being omitted for reasons of clarity.
Figure 8:
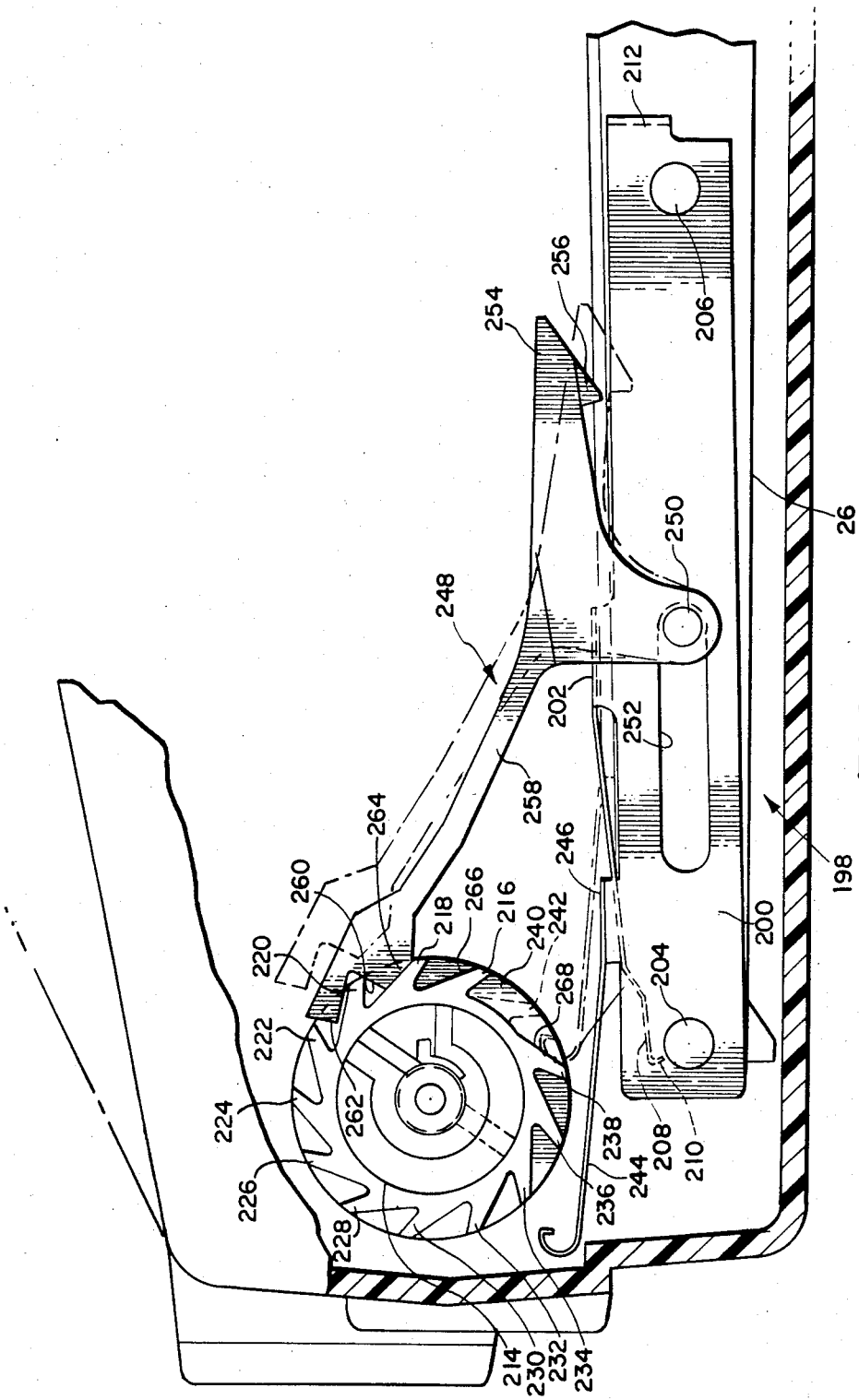
FIG. 8 is an enlarged elevational view of a portion of the rear right side of the camera.

The camera 10 also includes a film counter which comprises a drum 214 that is rotatably supported about a horizontal axis and which is spring biased in a clockwise direction into the position shown in FIGS. 4 and 8. The periphery of the drum 214 is provided with indicia which is indicative of the number of unexposed film units in the film cassette 26, such indicia being viewable through a window (not shown) in the trailing end wall 20 of the camera 10. Extending radially outwardly from the drum 214 are a plurality of evenly spaced teeth 216, 218, 220, 222, 224, 226, 228, 230, 232, 234, 236 and 238, with the teeth 238 and 216 being separated by a space 240. The space 240 is the result of omitting a "tooth 242", shown in phantom in FIGS. 4 and 8. The "tooth 242" is omitted in order to prevent overwinding of the drum's spring by continued indexing of the drum 214 subsequent to the exposure of the last film unit (tenth) in the film cassette 26. The drum 214 is indexed in a counterclockwise direction by a hook 244 which is attached to still another flange 246 which extends from the plate 200. The drum 214 is maintained in the indexed position by a pawl 248. The pawl 248 is rotatively supported for movement between the solid and broken line positions shown in FIG. 4 by a pin 250. The pin 250 extends inwardly from the side wall 16 of the camera 10 and the plate 200 is provided with a slot 252 for receiving its opposite end so as to permit reciprocating movement of the plate 200. The pawl 248 includes a first arm 254 having an inwardly extending portion 256 which, when in the broken line position, is located in the path of travel of the trailing end wall of the film cassette 26 as it is being inserted into the film chamber 24. The pawl 248 also includes a second arm 258 which is relatively resilient so as to enable it to ride up and over the teeth of the film counter while the first arm 254 is maintained steady due to its engagement with the front or forward wall of the film cassette 26. The free end of the second arm 258 is provided with first and second working surfaces 260 and 262 which are adapted to maintain the drum 214 in its newly indexed position.

After a new film cassette 26 containing a plurality of film units and a thin flat battery has been loaded into the film chamber 24, rotation of the spread roller housing 28 into the position shown in FIG. 3 is effective to close an electrical circuit between the battery and the motor 190 to commence a cycle in which an opaque dark slide will be removed from the film cassette 26 and directed to the exterior of the camera 10 via the slot 38 in the spread roller housing 28. As this cycle begins, the plate 200 is moved toward its broken line position due to the previously described interaction between the pin 196 and the flange 212, and the hook 244 moves from its solid line position to its broken line position. During such movement of the hook 244, it engages the tooth 236 and rotates the drum 214 in a counterclockwise direction through an angle of approximately forty-seven (47) degrees. During such rotation, a surface 264 of the tooth 218 cams the resilient second arm 258 upwardly, the first arm 254 being maintained in place due to its engagement with the forward wall of the film cassette 26. As the surface 264 is rotated out of engagement with the second arm 258, a surface 266 on the tooth 216 moves into engagement therewith and continues to maintain the end of the second arm 258 in a deflected condition. As the rotation of the drum approaches forty-seven degrees, the pin 196 rotates out of engagement with the flange 212 thus permitting the aforementioned spring (not shown) to return the plate 200 and the hook 244 to their original positions, as shown in solid lines in FIG. 4. The return movement of the hook 244 permits the film counter's spring to rotate the drum 214 in a clockwise direction through an angle of approximately nineteen (19) degrees until the tip of the tooth 218 moves into engagement with the first working surface 260 of the second arm 258 thus arresting continued clockwise rotation of the drum 214. Note, at this time the tip of the tooth 220 is slightly spaced from the second working surface 262 of the second arm 258. The just described cycle was effective to remove an opaque dark slide from the film cassette 26 and move it to the exterior of the camera 10 via the exit slot 38 while simultaneously presenting a character located on the periphery of the drum 214 to a film counter viewing window (not shown) in the trailing end wall 20 of the camera 10, such character being indicative of the number of film units in the film cassette 26.

Upon the subsequent actuation of the button 92, which commences an exposure and film processing cycle, the hook 244 engages the tooth 234 so as to again index or drive the drum 214 counterclockwise through an angle of approximately forty-seven degrees while the uppermost film unit in the film container 26, which has been exposed, is driven into the bite of the rollers 30 and 32 by the free end 210 of the arm 208. During this rotation, the surface 266 of the tooth 216 moves and maintains the end of the second arm 258 in the deflected condition. As the hook 244 returns to its original position, the drum 214 again reverses its rotation until the tip of the tooth 216 moves into engagement with the first working surface 260 of the second arm 258. During the next cycle, the hook 244 engages the tooth 232 and indexes the drum 214 in a counterclockwise direction, as described previously. Initially, the surface 266 of the tooth 216 cams the second arm 258 into the deflected condition. As the surface 266 moves out of engagement with the second arm 258 it, the second arm, moves back toward its original position only to be cammed again into the deflected condition by a surface 268 of the tooth 238. When the hook 244 reverses its direction of movement, the drum again rotates in a clockwise direction until the tip of the tooth 216 engages the second working surface 262 of the second arm 258. But for the second working surface 262, the drum 214 would continue to rotate in a clockwise direction until the tooth 216 engaged the first working surface 260, which happens to be the position the drum 214 was in prior to being indexed.

Subsequent to each additional actuation of the button 92, the drum 214 is indexed and maintained in the newly indexed position by contact between the end of one of the teeth 238, 236, 234, 232, 230, 228, 226 and 224, respectively and the first working surface 260. At this time, i.e., when the tooth 224 is in engagement with the surface 260, the film cassette 26 is empty, ten film units having been exposed and moved to the exterior of the camera, and the orientation of the teeth on the drum 214 is such that only the tooth 216 is located in the path of travel of the hook 244, and to be more precise, the tooth 216 is positioned such that it is engaged as the hook 244 approaches the end of its path of travel. Accordingly, further actuation of the button 92 when the film cassette 26 is empty will result in the hook 244 traversing the area 240 before engaging the tooth 216. Such engagement is ineffective to rotate the drum 214 through an angle sufficient to further index the drum 214, i.e., to move the tooth 222 into engagement with the first working surface 260 of the second arm 258. When the user of the camera removes the empty film cassette 26 from the film chamber 24, the end 256 of pawl 248 is allowed to rotate in a clockwise direction into the broken line position thus releasing the second arm 258 from latching engagement with the tooth 224. The drum 214 is now driven in a clockwise direction by its tensioned spring (not shown) until it reaches the position shown in FIGS. 4 and 8 wherein a suitable stop arrests further clockwise rotation of the drum 214.

As previously described, the skirt 114, which extends downwardly from the cone-shaped assembly 94, closes off the triangular shaped gap that appears on the left side of the camera 10 when first and second housings 12 and 44, respectively, are in the erected condition, as shown in FIG. 3. Also, the pivotally mounted plate 74 closes off the space between the end of the slanting portion 46 of the leading end wall 18 and the face of the module 60 when the camera is in the erected condition. The only other space between the housings 12 and 44 when the camera is erected is closed off by a skirt 270 (see FIG. 4) which extends downwardly from the cone-shaped assembly 94 to a point where its lower edge 272 is located just below the top 274 of a gear train support plate 276. The support plate 276, (shown partially cut away in FIG. 4, as is the side wall 16) extends upwardly from the bottom wall 22 of the camera and between the side wall 16 and the skirt 270 and provides a means for supporting the outwardly facing ends of the shafts of the gear train 192, the inwardly facing shaft ends being supported by a frame, not shown. Thus, the skirts 114 and 270 and the plate 74 cooperate to encompass or shield those portions of the bellows 180 which would otherwise be visible when the camera is in the erected condition. Accordingly, not only is damage to the bellows 180 minimized but also the adverse effects of pin hole leaks in the bellows is reduced because of the light shielding effects of the skirts 114 and 270 and the plate 74.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A folding camera comprising:

a first housing including means defining a film chamber for receiving and locating a film cassette in position for the exposure of a film unit contained therein; a second housing pivotally connected to said first housing for movement between a folded inoperative position and an erected operative position, said second housing including means for directing image bearing rays emanating from a scene being photographed toward said chamber;

a flexible bellows connected to said first and second housings to provide a tunnel within which image bearing rays may travel from said second housing toward said chamber and for excluding other rays from passage from said second housing to said chamber, said bellows including at least one wall; and an erecting assembly connected to said first and second housings at points exteriorly of said tunnel for movement between an extended position wherein it releasably maintains said second housing in said erected operative position and a collapsed position wherein it permits movement of said second housing into said folded position while simultaneously engaging and supporting said wall of said bellows as said wall is moved into said tunnel so as to prevent its movement into said chamber.

2. A folding camera as defined in claim 1 wherein said erecting assembly including first and second links pivotally coupled to said first and second housings, respectively, and to each other, whereby as said erecting assembly moves toward said collapsed position the pivotal interconnection between said first and second links moves into engagement with said wall of said bellows and folds said walls inwardly into said tunnel while simulatneously supporting the same.

3. A folding camera as defined in claim 2 wherein the pivotal connection between said first and second links is located substantially adjacent to a line connecting the pivots of said first and second links to said first and second housings, respectively, when said second housing is in said erected position.

4. A folding camera as defined in claim 3 wherein said first and second links comprise a pair of substantially planar members which extends laterally of said camera.

5. A folding camera as defined in claim 2 wherein said wall of said bellows is substantially wrapped around said first and second links when said erecting assembly is in said collapsed position.

* * * * *